United States Patent
Goto et al.

(10) Patent No.: US 11,974,312 B2
(45) Date of Patent: Apr. 30, 2024

(54) ALLOCATION METHOD AND SIGNAL PROCESSING APPARATUS

(71) Applicant: NIPPON TELEGRAPH AND TELEPHONE CORPORATION, Tokyo (JP)

(72) Inventors: Kazuto Goto, Musashino (JP); Hideki Toshinaga, Musashino (JP); Yushi Shirato, Musashino (JP); Mizuki Suga, Musashino (JP); Kota Ito, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 371 days.

(21) Appl. No.: 17/431,694

(22) PCT Filed: Jan. 31, 2020

(86) PCT No.: PCT/JP2020/003692
§ 371 (c)(1),
(2) Date: Aug. 17, 2021

(87) PCT Pub. No.: WO2020/170764
PCT Pub. Date: Aug. 27, 2020

(65) Prior Publication Data
US 2022/0141838 A1   May 5, 2022

(30) Foreign Application Priority Data
Feb. 19, 2019   (JP) .................................. 2019-027783

(51) Int. Cl.
*H04W 72/54*   (2023.01)
*H04W 28/04*   (2009.01)
(Continued)

(52) U.S. Cl.
CPC ........... *H04W 72/54* (2023.01); *H04W 28/04* (2013.01); *H04W 56/004* (2013.01); *H04W 72/0446* (2013.01)

(58) Field of Classification Search
CPC ... H04W 72/54; H04W 28/04; H04W 56/004; H04W 72/0446; H04W 72/541; H04W 16/14; Y02D 30/70
See application file for complete search history.

(56) References Cited

U.S. PATENT DOCUMENTS

| 2014/0050177 A1* | 2/2014 | Takano ............... H04W 72/541 |
| | | 370/329 |
| 2019/0230580 A1* | 7/2019 | Kim ...................... H04W 48/16 |
| 2020/0077343 A1* | 3/2020 | Yeo ........................ H04L 5/0094 |

FOREIGN PATENT DOCUMENTS

| JP | 2007129570 A | 5/2007 | |
| JP | 2008167010 A | 7/2008 | |
| WO | WO-2017073465 A1 * | 5/2017 | ............ H04W 28/04 |

OTHER PUBLICATIONS

Ooseki et al., "Base Station Device, Terminal Device, Communication Method and Program", May 4, 2017, WO, English translation of WO-2017073465. (Year: 2017).*

(Continued)

*Primary Examiner* — Michael K Phillips
(74) *Attorney, Agent, or Firm* — Harness, Dickey & Pierce, P.L.C.

(57) ABSTRACT

An allocation method for allocating individual downlink data signals to positions on a time axis when a base station transmits the individual downlink data signals to a plurality of terminal stations. The allocation method includes provisionally allocating individual downlink data signals of the individual downlink data signals for terminal stations having long propagation delay times to positions of relatively early timings and provisionally allocating individual downlink (Continued)

data signals of the individual downlink data signal for terminal stations having short propagation delay times to positions of relatively late timings, changing the positions such that, when it is estimated that a collision will occur when receiving response signals transmitted from the terminal stations, it is estimated that a collision will not occur, in the provisionally allocating, and fixing, as the positions of the individual downlink data signals on the time axis, the positions changed in the changing of the positions.

4 Claims, 7 Drawing Sheets

(51) Int. Cl.
    *H04W 56/00*    (2009.01)
    *H04W 72/0446*    (2023.01)

(56) References Cited

OTHER PUBLICATIONS

IEEE802.11 Usage Model 10: mmWave Distribution Network IEEE 802.11-2015/0625r7, Aug. 2017.

Masayuki Fujise, Study on System Concepts for Multiple Service Wireless Communications based on ROF, IEICE Transactions B, vol. J84-B, No. 4, 2001, pp. 655-665.

Yusei Okamoto et al., Throughput improvement of Wireless LAN system with RoF employing AP control, IEICE Technical Report, vol. 112, No. 443, 2013, pp. 97-102.

S. Deronne et al., Analysis of the MAC Performances in 802.11g Radio-over-Fiber Systems, 2011 18th IEEE Symposium on Communications and Vehicular Technology in the Benelux (SCVT), Nov. 22, 2011, pp. 1-5.

* cited by examiner

ALLOCATION METHOD AND SIGNAL PROCESSING APPARATUS

CROSS-REFERENCE TO RELATED APPLICATIONS

This application is a 371 U.S. National Phase of International Application No. PCT/JP2020/003692 filed on Jan. 31, 2020, which claims priority to Japanese Application No. 2019-027783 filed on Feb. 19, 2019. The entire disclosures of the above applications are incorporated herein by reference.

TECHNICAL FIELD

The present disclosure relates to a radio communication technology between a base station and a plurality of terminal stations.

BACKGROUND ART

In recent years, the use of millimeter wave bands available for radio bands wider than microwave bands has been focused on to meet the increasing demand for radio communication. For example, IEEE 802.11ay is being discussed as a next-generation wireless LAN standard in the 60 GHz band.

As described in Non Patent Literature 1, various usage models have been considered in IEEE 802.11ay. There is a "mmWave distribution network" as a model, which was added on July 2017. The mmWave distribution network is a usage model for constructing a relay network that replaces optical fiber with millimeter waves. In the mmWave distribution network, a mmWave distribution node (corresponding to a base station) installed outdoors and a radio apparatus (mmWave sector; corresponding to a terminal station) installed at the periphery of a building are connected. The mmWave distribution node and the radio apparatus are securely installed.

Propagation loss in a free space increases in proportion to frequency. Thus, millimeter wave band communication has a reduced propagation distance. As a result, there is a problem with millimeter wave band communication in that communication may be performed only in a limited area. In order to extend the communication area, a method of multi-hopping through a plurality of nodes can be considered. However, as the number of hops increases, transmission efficiency deteriorates.

As the number of nodes increases due to the increase in the number of hops, costs increase.

As a method for solving such problems, a method for separating a signal processing unit and an antenna unit by using Radio on Fiber (RoF) and arranging the antenna unit as an extension station has been proposed as described in Non Patent Literature 2. Such an arrangement may extend the apparent coverage area. In this method, the coverage area may be extended by connecting a plurality of antenna units to one signal processing unit. By separating the signal processing unit and the antenna unit, the configuration of the extension station may be simplified and power saving may be achieved. An advantage in terms of costs may be expected by consolidating a plurality of extension stations for one signal processing unit.

In a system using RoF, a propagation delay caused by a propagation distance longer than in a normal radio system (hereinafter, referred to as a "long delay") occurs. The transmission efficiency deteriorates due to such a propagation delay. Thus, there is a need for a technology that eliminates the deterioration in the transmission efficiency in a long-delay environment.

Non Patent Literature 3 proposes a collision avoidance mechanism as an example of a radio communication method for improving throughput characteristics in a wireless LAN system to which RoF is applied. Non Patent Literature 3 specifically proposes a method for avoiding collision of frames by expanding a network allocation vector (NAV: a terminal not involved in transmission and reception is prohibited from transmitting) period of time in accordance with the propagation delay time.

Non Patent Literature 4 describes a method for avoiding collision of frames by expanding a slot time which is a time unit in communication of the wireless LAN system in accordance with the propagation delay time in the wireless LAN system to which RoF is applied.

CITATION LIST

Non Patent Literature

Non Patent Literature 1: "IEEE 802.11 TGay Use Cases", IEEE 802.11-2015/0625r7, 2017 July Non Patent Literature 2: Fujise Masayuki, "Study on System Concepts for Multiple Service Wireless Communications based on ROF", the Journal of the Institute of Electronics, Information and Communication Engineers. B, Vol. J84-B, No. 4, pp. 655-665, 2001 April Non Patent Literature 3: Okamoto Yusei, Sangenya Yuki, Morikura Masahiro, Yamamoto Koji, Nuno Fusao, Sugiyama Takatoshi, "Throughput improvement of Wireless LAN system with RoF employing AP control", IEICE technical report, vol. 112, no. 443, RCS2012-300, pp. 97-102, 2013 February Non Patent Literature 4: S. Deronne, V. Moeyaert, and S. Bette, "Analysis of the MAC Performances in 802.11g Radio-over-Fiber Systems", Proc. 18th IEEE SCVT, pp. 1-5, 2011 November

SUMMARY OF THE INVENTION

Technical Problem

As stated above, in a wireless LAN system to which RoF has been applied, the collision of frames (signals) caused by a long delay may be avoided. However, during communication between a base station and a certain terminal station, other terminal stations are prohibited from transmitting. Thus, an idle time of the radio band is caused by the long delay. As a result, there is a problem that transmission efficiency is not improved. Such a problem is not a problem specific to RoF, and is a problem common to systems in which the idle time of the radio band is caused by the long delay in performing radio communication with a plurality of terminal stations from a base station.

The present disclosure has been made in view of the above circumstances, and an object of the present disclosure is to provide a technology capable of improving transmission efficiency in a system that performs radio communication between a base station and a plurality of terminal stations.

Means for Solving the Problem

An aspect of the present disclosure provides an allocation method for, when a base station transmits individual downlink data signals to a plurality of terminal stations, allocating the individual downlink data signals to positions on a time axis. The allocation method includes provisionally allocating individual downlink data signals of the individual downlink data signals for terminal stations of the plurality of terminal stations having long propagation delay times to positions of relatively early timings and provisionally allocating individual downlink data signals of the individual downlink data signals for terminal stations of the plurality of terminal stations having short propagation delay times to positions of relatively late timings, changing the positions such that, when it is estimated that a collision will occur when receiving response signals transmitted from the terminal stations, it is estimated that the collision does not occur in the provisionally allocating, and fixing, as the positions of the individual downlink data signals on the time axis, the positions changed in the changing of the positions.

In the allocation method according to the aspect of the present disclosure, in the changing of the positions, when it is estimated that a collision will occur when receiving the response signals transmitted from the terminal stations, the positions may be changed by replacing the position of an individual downlink data signal of the individual downlink data signals corresponding to at least one of the response signals for which it is estimated that the collision will occur with the position of another individual downlink data signal of the individual downlink data signals.

In the allocation method according to the aspect of the present disclosure, the positions on the time axis may be slots for time division duplex (TDD).

In the allocation method according to the aspect of the present disclosure, in the changing of the positions, when it is estimated that a collision will occur when receiving the response signals transmitted from the terminal stations, the positions may be changed by setting an idle time in which an individual downlink data signal of the individual downlink data signals is not allocated between the position of a certain individual downlink data signal of the individual downlink data signals corresponding to at least one of the response signals for which it is estimated that the collision will occur and the position of another individual downlink data signal of the individual downlink data signals continuous with the certain individual downlink data signal.

Another aspect of the present disclosure provides a signal processing apparatus including a base station configured to transmit individual downlink data signals to a plurality of terminal stations. The signal processing apparatus includes an allocation unit configured to allocate the individual downlink data signals to positions on a time axis. The allocation unit is configured to provisionally allocate individual downlink data signals of the individual downlink data signals for terminal stations of the plurality of terminal stations having long propagation delay times to positions of relatively early timings, provisionally allocate individual downlink data signals of the individual downlink data signals for terminal stations of the plurality of terminal stations having short propagation delay times to positions of relatively late timings, change the positions such that, when it is estimated that a collision will occur when receiving response signals transmitted from the terminal stations, it is estimated that the collision will not occur, in the provisionally allocating, and fix, as the positions of the individual downlink data signals on the time axis, the changed positions.

Effects of the Invention

According to the present disclosure, transmission efficiency may be improved in a system that performs radio communication between a base station and a plurality of terminal stations.

DESCRIPTION OF EMBODIMENTS

System Configuration

Figure 1:
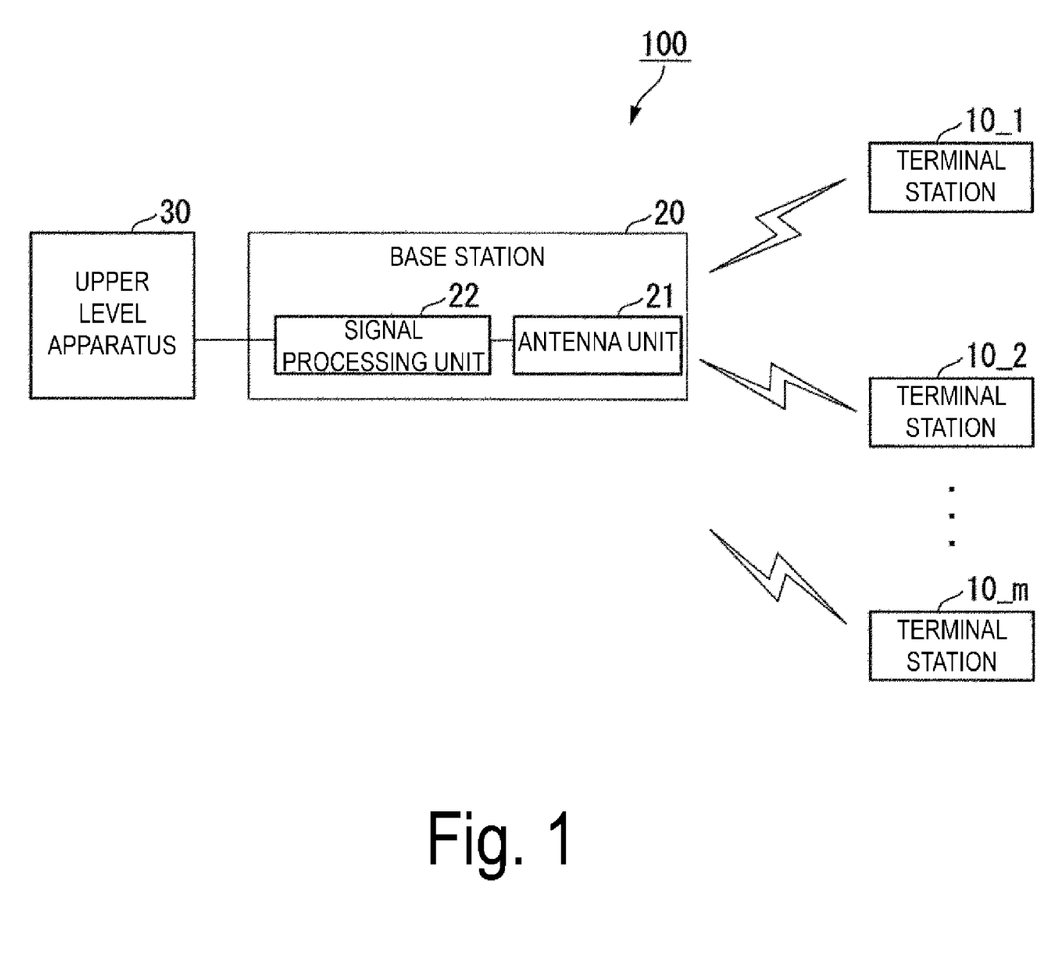
FIG. 1 is a diagram illustrating a configuration example of a radio communication system 100.

FIG. 1 is a diagram illustrating a configuration example of a radio communication system 100. The radio communication system 100 includes a plurality of terminal stations 10 (10_1 to 10_m) and a base station 20. m is an integer of 2 or more. An upper level apparatus 30 is connected to the base station 20 of the radio communication system 100. Each terminal station 10 may communicate with the upper level apparatus 30 via the base station 20.

The terminal station 10 is an apparatus that wirelessly communicates with the base station 20. The terminal station 10 may be, for example, a communication apparatus that relays communication to other apparatuses, may be an information apparatus such as a mobile phone or a home appliance, or may be an Internet of Things (IoT) apparatus. Specific examples of the communication apparatus include a router and a mobile router. A specific example of the mobile phone is a smartphone. Specific examples of the home appliance include a television receiver, a domestic appliance, a personal computer, a set-top box, and a home gateway. Specific examples of the IoT apparatus include a sensor and an actuator. The terminal station 10 may be securely installed, or may be a mobile body whose position changes. Specific examples of the mobile body include the above-mentioned mobile phone and a wearable computer such as a smart watch.

The base station 20 is an apparatus that relays communication between the upper level apparatus 30 and the terminal station 10. The base station 20 includes an antenna unit 21 and a signal processing unit 22. The base station 20 is realized, for example, by using RoF. In this case, the antenna unit 21 and the signal processing unit 22 are implemented in different housings and are arranged at separate positions. For example, the signal processing unit 22 may be securely installed as a signal processing apparatus in a building such as a station facility. For example, the antenna unit 21 may be securely installed in a facility such as a building, an electric pole, or the like that is different from the station facility. When the terminal station 10 is securely installed, the antenna unit may be securely installed at the periphery of a location where the terminal station 10 is installed. However, the base station 20 need not necessarily be implemented by using RoF.

The antenna unit 21 transmits a downlink data signal to the terminal station 10 by radio communication. The antenna unit 21 may communicate with the terminal station 10 by using, for example, radio signals in the millimeter wave band.

The downlink data signal includes a plurality of individual downlink data signals. The individual downlink data signal is a signal transmitted from the upper level apparatus 30 to each of the terminal stations 10.

The antenna unit 21 receives individual uplink data signals from the terminal stations 10. One specific example of the individual uplink data signal is a response signal (ACK signal). Another specific example of the individual uplink data signal is a signal addressed to the upper level apparatus 30.

Upon receiving individual downlink data signals from the upper level apparatus 30, the signal processing unit 22 generates a downlink data signal by mapping the individual downlink data signals such that the signals do not collide with each other on a time axis. The signal processing unit 22 transmits the generated downlink data signal to the antenna unit 21.

The upper level apparatus 30 communicates with each of the terminal stations 10 via the base station 20. The upper level apparatus 30 performs information processing in accordance with, for example, a request transmitted from the terminal station 10, and transmits, as the downlink data signal, data corresponding to the request to the terminal station 10. The upper level apparatus 30 may be, for example, a server apparatus, may be a cloud, or may be implemented as another apparatus.

Next, the base station 20 will be described in detail. There are a plurality of embodiments of the base station 20. Hereinafter, a first embodiment (base station 20a) of the base station 20 and a second embodiment (base station 20b) of the base station 20 will be described.

First Embodiment

Figure 2:
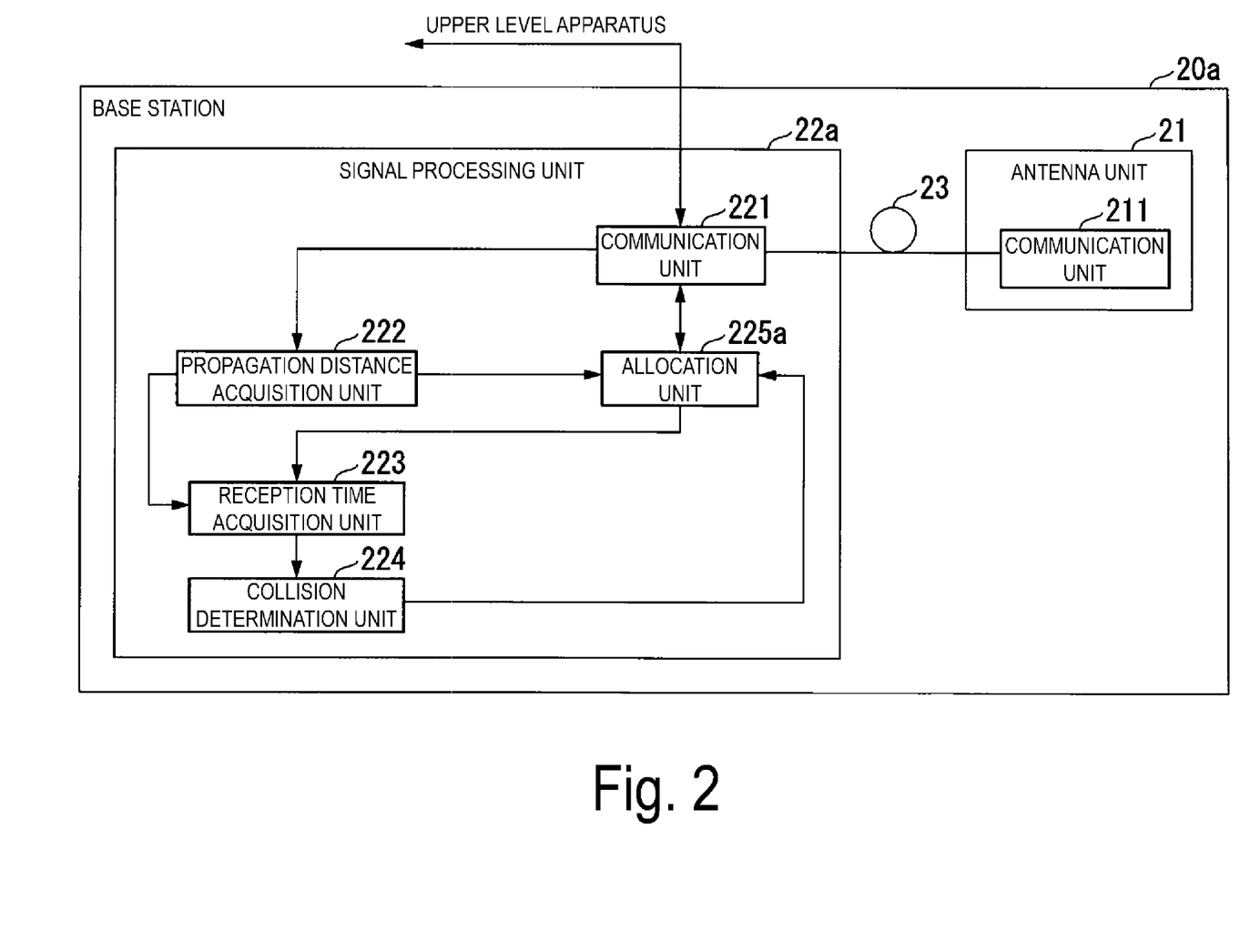
FIG. 2 is a diagram illustrating a detailed configuration example of a base station 20 (base station 20a) of a first embodiment.

The first embodiment (base station 20a) of the base station 20 transmits a downlink data signal to each of the terminal stations 10 by time division duplex (TDD). The base station 20a allocates individual downlink data signals to TDD slots for early timings in order from the signals addressed to the terminal stations 10 having large propagation distances. When times at which the response signals (ACK signals) transmitted from the terminal stations 10 are received by the base station 20a overlap with each other, the response signals may collide with each other. To suppress such collision, when it is estimated that a collision of the response signals will occur, the base station 20a changes the TDD slots to which the individual downlink data signals are allocated. The TDD slots which are allocation destinations of the individual downlink data signals are repeatedly changed until it is estimated that a collision does not occur. As stated above, in the first embodiment, the collision of the response signals is suppressed by changing the time frames (for example, TDD slots) to which the individual downlink data signals are assigned. Hereinafter, the base station 20a will be described in more detail.

FIG. 2 is a diagram illustrating a detailed configuration example of the base station 20 (base station 20a) of the first embodiment.

The base station 20a includes the antenna unit 21 and a signal processing unit 22a. The antenna unit 21 includes a communication unit 211. The communication unit 211 receives a downlink data signal from the signal processing unit 22a via an optical cable 23. The communication unit 211 radiates a radio wave including the received downlink data signal from an antenna.

The signal processing unit 22a includes a communication unit 221, a propagation distance acquisition unit 222, a reception time acquisition unit 223, a collision determination unit 224, and an allocation unit 225a.

The communication unit 221 is realized by using a communication interface. The communication unit 221 is connected so as to be able to communicate with the upper level apparatus 30 via a communication path. The communication unit 221 transmits an uplink data signal to the upper level apparatus 30. The communication unit 221 receives individual downlink data signals from the upper level apparatus. The communication unit 221 is connected so as to be able to communicate with the antenna unit 21 via the optical cable 23. The communication unit 221 receives an uplink data signal from the antenna unit 21. The communication unit 221 transmits a downlink data signal generated by the allocation unit 225a to the antenna unit 21 via the optical cable 23.

The propagation distance acquisition unit 222 acquires information indicating a propagation distance between the antenna unit 21 and the terminal station 10 (hereinafter, referred to as "propagation distance information"). The propagation distance information may be, for example, the time required for the radio wave to reach the terminal station 10 from the antenna unit 21. The propagation distance information may be, for example, a physical distance from the antenna unit 21 to the terminal station 10, or may be a physical distance from the communication unit 221 to the terminal station 10. The propagation distance information may be acquired based on, for example, a propagation delay time obtained by the communication unit 221. Specific examples of a method for acquiring the propagation delay time will be described below.

The communication unit 221 measures a time from transmission of the individual downlink data signal addressed to the terminal station 10 for which the propagation delay time is acquired to reception of the response signal. The communication unit 221 acquires, as the propagation delay time, a time which is half of the measured time. The above example is a first specific example. The communication unit 221 records a transmission time in the individual downlink data signal addressed to the terminal station 10 for which the propagation delay time is acquired, and transmits the individual downlink data signal. The terminal station 10 that has received the individual downlink data signal records, in the response signal, the transmission time included in the individual downlink data signal and the time at which the individual downlink data signal was received by the terminal station (reception time).

The terminal station 10 transmits the response signal to the base station 20a. The communication unit 221 acquires the reception time and the transmission time from the received response signal. The communication unit 221 acquires, as the propagation delay time, a difference between the reception time and the transmission time. The above example is a second specific example. The method of acquiring the propagation delay time need not be limited to the two specific examples described above. When the signal length of the individual downlink data signals is variable, the propagation delay time may be acquired as a time required per unit signal length.

The reception time acquisition unit 223 estimates a time at which the response signal to be transmitted from the terminal station 10 in response to the individual downlink data signal will be received by the base station 20a (hereinafter, referred to as a "response reception time") for each individual downlink data signal to be transmitted. The response reception time includes, for example, a time at which reception starts and a time at which reception ends. For example, the reception time acquisition unit 223 may estimate the response reception time based on a scheduled transmission time of the individual downlink data signal, the propagation delay time, a processing time from when the terminal station 10 receives the individual downlink data signal to when the response signal is transmitted, and a signal length (signal processing time) of the response signal. The processing time from when the terminal station 10 receives the individual downlink data signal to when the terminal station transmits the response signal and the signal length (signal processing time) of the response signal may be stored as fixed values in the signal processing unit 22a in advance.

When the response signal to be transmitted from the terminal station 10 in response to the individual downlink data signal is received by the base station 20a, the collision determination unit 224 determines whether the received response signal collides with response signals corresponding to other individual downlink data signals for each individual downlink data signal to be transmitted. For example, the collision determination unit 224 determines whether a collision will occur based on the reception time of each response signal acquired by the reception time acquisition unit 223.

The allocation unit 225a decides the TDD time slot to which each individual downlink data signal is allocated according to a plurality of criteria. An outline of processing of the allocation unit 225a is as follows. First, the allocation unit 225a provisionally allocates the individual downlink data signals to early TDD slots in order from the signals addressed to the terminal stations 10 having long propagation distances based on the propagation distances acquired by the propagation distance acquisition unit 222. When the collision determination unit 224 determines that a collision of the response signals occurs, the allocation unit 225a changes the TDD slots to which the individual downlink data signals are provisionally allocated.

A reason the individual downlink data signals are provisionally allocated to early TDD slots in order from the signals addressed to the terminal stations 10 having long propagation distances will be described. As the propagation distance becomes long, the propagation delay time required to transmit the individual downlink data signal to the terminal station 10 becomes long. As the propagation delay time becomes long, the idle time of the radio band becomes long. Thus, the transmission of the individual downlink data signal to the terminal station 10 becomes a bottleneck for transmission efficiency. Thus, it is effective to complete the transmission of the individual downlink data signal to the terminal station 10 with the longest propagation delay time as soon as possible. The individual downlink data signals to the other terminal stations 10 may also be transmitted during the long idle time of the radio band that occurs. Transmission efficiency is improved by realizing such control. In contrast, when the individual downlink data signals are transmitted in ascending order of the propagation distances from the terminal stations 10, the idle time of the radio band that occurs is relatively short, and it is difficult to create an opportunity to transmit the individual downlink data signals to the other terminal stations 10 by using this idle time. Thus, the improvement of transmission efficiency is limited.

Figure 3:
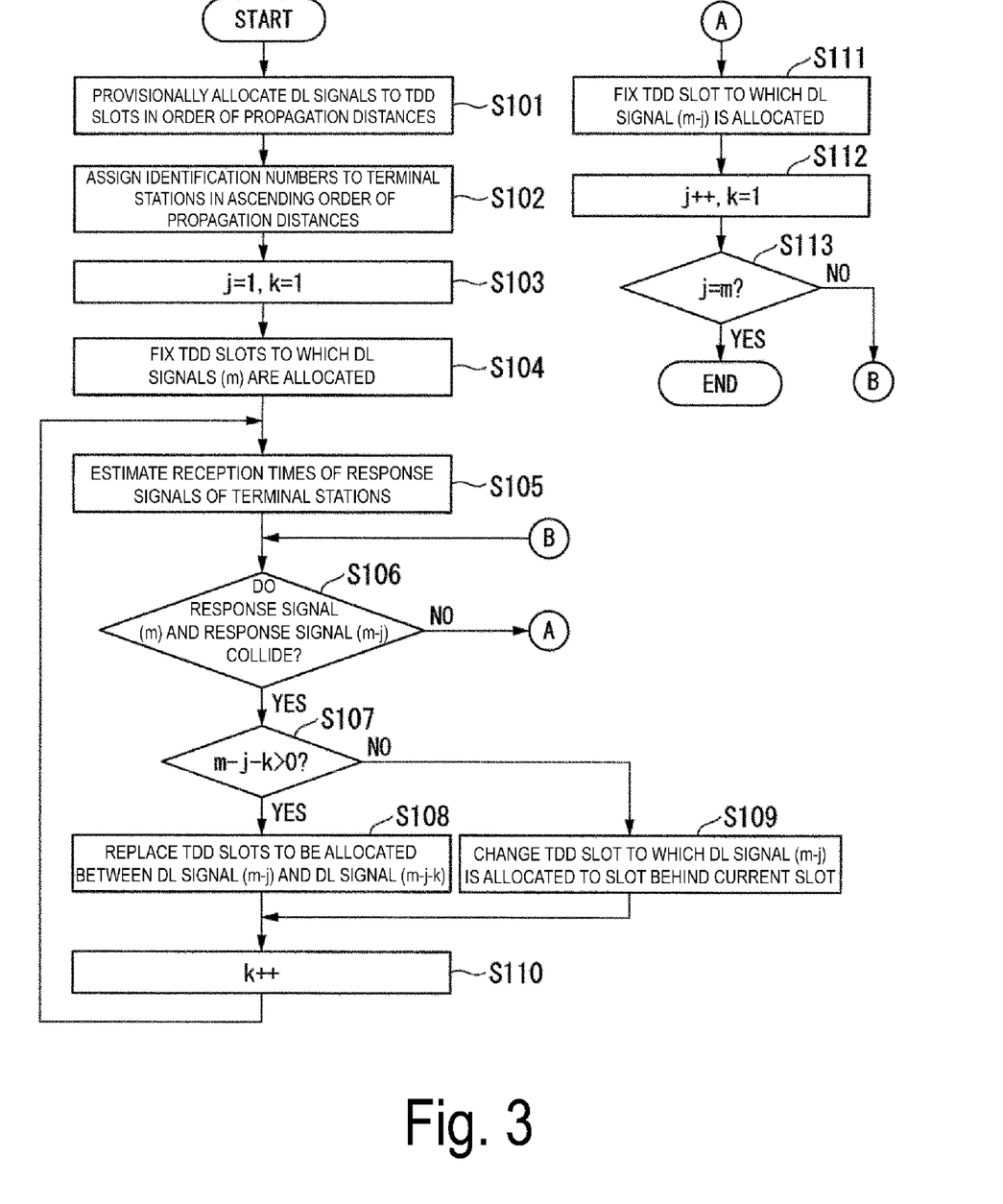
FIG. 3 is a flowchart illustrating a specific example of a flow of an operation of the base station 20a (first embodiment).

FIG. 3 is a flowchart illustrating a specific example of a flow of an operation of the base station 20a (first embodiment). In FIG. 3, the individual downlink data signals are described as "DL signals", the individual downlink data signals addressed to the terminal stations 10 having identification numbers i (i is an integer of 1 or more and m or less) are described as "DL signals (i)", and the response signals transmitted from the terminal stations 10 having the identification number i are described as "response signals (i)". As will be described below, the identification numbers are given in ascending order of the propagation distances, and thus, the DL signal of the terminal station 10 having the longest propagation distance is described as the "DL signal (m)". Similarly, the DL signal of the terminal station 10 having the shortest propagation distance is described as the "DL signal (1)".

First, the allocation unit 225a provisionally allocates the individual downlink data signals to early TDD slots in order from the signals addressed to the terminal stations 10 having large propagation distances (step S101). The propagation distances are acquired by the propagation distance acquisition unit 222. When the base station 20a and the terminal stations 10 are securely installed, the propagation distances may be stored as known distances in a storage device of the signal processing unit 22a in advance. In the above-described case, the value of the propagation distances acquired once by the propagation distance acquisition unit 222 may be used for a predetermined period of time.

The allocation unit 225a assigns identification numbers to the terminal stations 10 in ascending order of the propagation distances (step S102). The identification numbers are, for example, integers arranged in order from 1. In this case, the identification number of the terminal station 10 having the shortest propagation distance is "1", and the identification number of the terminal station 10 having the longest propagation distance is "m". Integer variables j and k are initialized (step S103). For example, "1" is substituted for j and k.

The allocation unit 225a fixes, as the TDD slot to which the DL signal (m), which is the individual downlink data signal to be transmitted to the m-th terminal station 10, is allocated, a provisionally allocated TDD slot (step S104). Specifically, a first TDD slot is fixed as an allocation destination of the DL signal (m).

Subsequently, the reception time acquisition unit 223 estimates the time at which the response signal transmitted by each terminal station 10 is received (response reception time) for each individual downlink data signal (step S105). The targets for which the response reception times are estimated are all the response signals.

Here, the collision determination unit 224 determines whether the response signal (m) which is the response signal transmitted by the m-th terminal station 10 and the response signal (m−j) which is the response signal transmitted by the (m−j)-th terminal station 10 collide with each other by comparing the response reception time of the response signal (m) with the response reception time of the response signal (m−j) (step S106). In the present embodiment, as described above, the TDD slots are set such that the transmission to the terminal station 10 (the m-th terminal station 10) having the longest propagation distance which causes the most severe bottleneck for transmission efficiency is performed first. Thus, one of the targets for which the times at which the response signals are received are compared is fixed to the m-th terminal station.

When the response reception time of the response signal (m) overlaps with the response reception time of the response signal (m−j), the collision determination unit 224 determines that a collision of the response signals will occur (step S106—YES). In this case, the allocation unit 225a performs the following processing. When the value of m−j−k is greater than 0 (step S107—YES), the TDD slots which are the provisional allocation destinations of the DL signal (m−j) and the DL signal (m−j−k) are replaced (step S108).

In contrast, when the value of m−j−k is equal to or less than 0 (is not greater than 0 or is equal to 0) (step S107—NO), the TDD slot which is the allocation destination of the DL signal (m−j) is changed to the earliest TDD slot (positioned in front) among the vacant slots positioned behind the current TDD slot (step S109). The reason such processing of step S109 is performed is that the collision could not be avoided in the first to m-th TDD slots in the case of step S107—NO. That is, in such a case, it is necessary to allocate the individual downlink data signal to the m-th or subsequent TDD slot.

After the processing of step S108 or step S109, the allocation unit 225a increments the value of k (step S110). The processing of the signal processing unit 22a returns to the processing of step S105. The processing of step S105 and subsequent steps are executed again after the processing of step S108 or S109 as stated above, and thus, a collision of the response signals newly caused by the replacement of the TDD slots may be prevented.

When the response reception time of the response signal (m) and the response reception time of the response signal (m−j) do not overlap with each other in the processing of step S106, the collision determination unit 224 determines that a collision of the response signals does not occur (step S106—NO). In this case, the allocation unit 225a performs the following processing.

First, the allocation unit 225a fixes, as the TDD slot to which the DL signal (m−j) is allocated, a TDD slot provisionally allocated at this moment (step S111). Subsequently, the value of j is incremented, and the value of k is set to 1 (step S112). When the value of j is not equal to the value of m (step S113—NO), the processing returns to the processing of step S106. In contrast, when the value of j is equal to the value of m (step S113—YES), the allocation of the TDD slots to the individual downlink data signals of all the terminal stations 10 is completed, and thus, the processing is completed.

Figure 4:
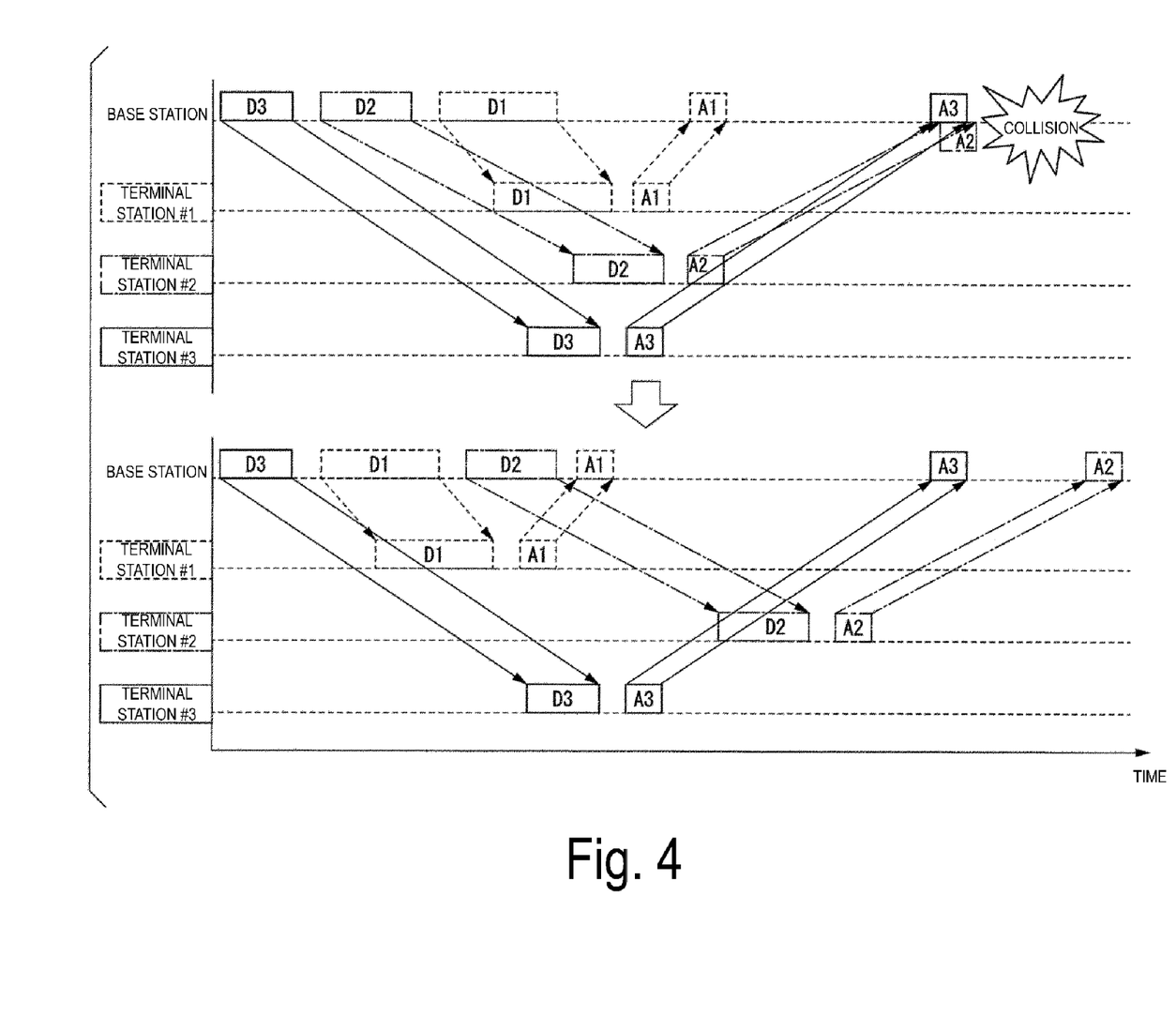
FIG. 4 is a diagram illustrating a specific example of processing when individual downlink data signals are transmitted from the base station 20a to three terminal stations 10 (m=3).

FIG. 4 is a diagram illustrating a specific example of processing when the individual downlink data signals are transmitted to three terminal stations 10 (m=3) from the base station 20a. In the example of FIG. 4, the propagation distances between the base station 20a and the terminal stations 10 are terminal station #1<terminal station #2<terminal station #3. D1, D2, and D3 indicate the individual downlink data signal addressed to the terminal station #1, the individual downlink data signal addressed to the terminal station #2, and the individual downlink data signal addressed to the terminal station #3, respectively. A1, A2, and A3 indicate the response signal transmitted from the terminal station #1, the response signal transmitted from the terminal station #2, and the response signal transmitted from the terminal station #3, respectively. In the example in FIG. 4, the TDD slot length is variable, but may be a fixed length. A top row in FIG. 4 represents initial TDD slots provisionally allocated to the individual downlink data signals in step S101. A bottom row in FIG. 4 represents the TDD slots definitely allocated to the individual downlink data signals by the allocation unit 225a.

First, the response reception time for each terminal station 10 is acquired based on the provisional allocation as represented in the top row in FIG. 4. In this example, the response signal (A2) transmitted by the terminal station #2 collides with the response signal (A3) transmitted by the terminal station #3. Thus, the allocation unit 225a replaces the TDD slots for the individual downlink data signal addressed to the terminal station #2 and the individual downlink data signal addressed to the terminal station #1 by the processing of step S108 illustrated in FIG. 3. A collision does not occur with the allocation of the TDD slots after the replacement. As a result, the allocation of the TDD slots represented in the bottom row in FIG. 4 is fixed.

In the first embodiment having the aforementioned configuration, it is determined whether a collision will occur when receiving response signals transmitted from the terminal stations 10. When it is determined that a collision will occur, the TDD slots which are the allocation destinations of the individual downlink data signals are changed. Thus, the base station 20a may continuously transmit the individual downlink data signals to the terminal stations 10. Accordingly, transmission efficiency may be improved by effectively using the idle time caused by a long delay.

Second Embodiment

Figure 5:
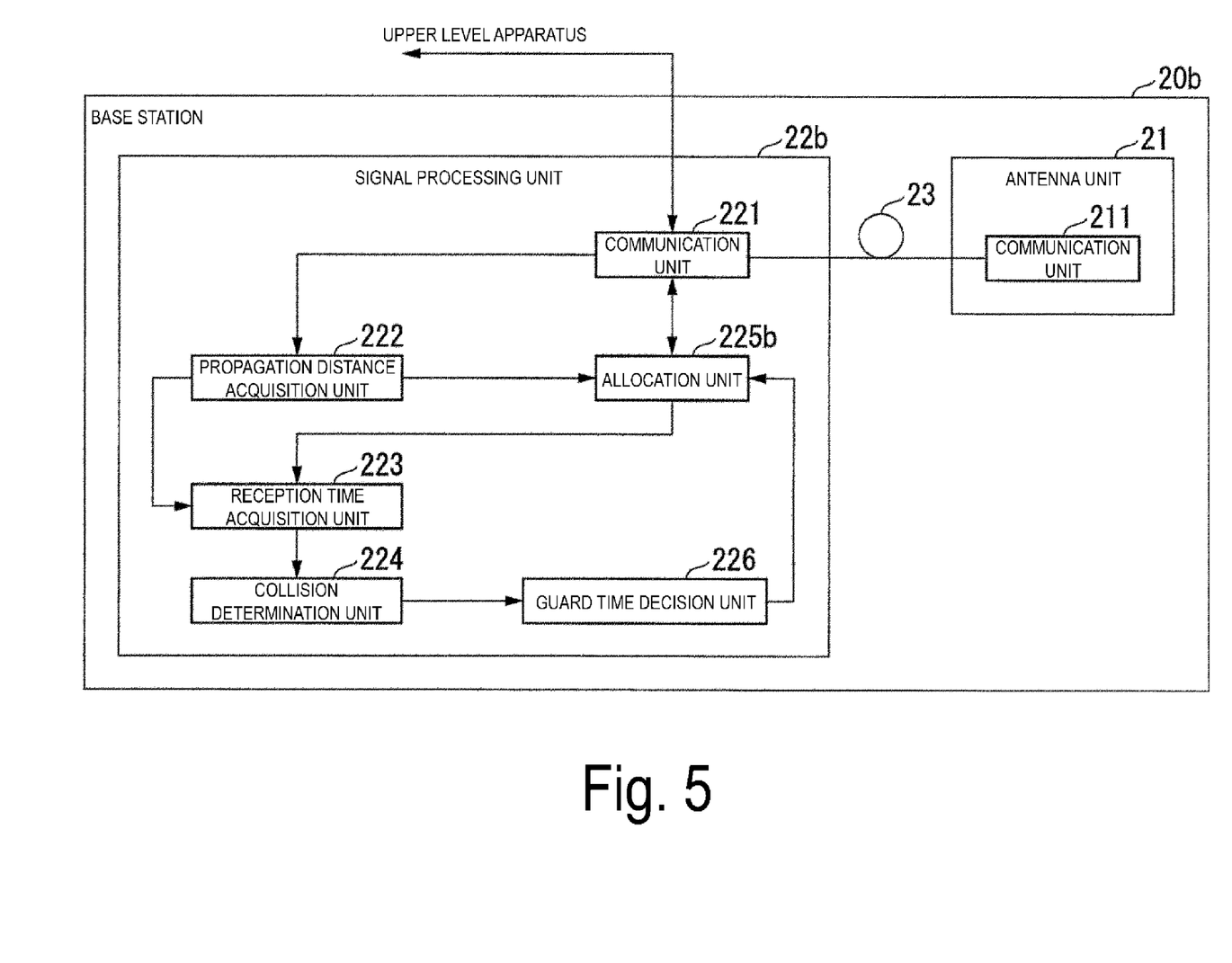
FIG. 5 is a diagram illustrating a detailed configuration example of a base station 20 (base station 20b) of a second embodiment.

The allocation of the individual downlink data signals implemented in a second embodiment (base station 20b) of the base station 20 is not limited to TDD. A technology different from TDD may be applied to the base station 20b as long as a communication method capable of distributively allocating individual downlink data signals on a time axis is used. The base station 20b suppresses a collision of the response times by providing an idle time in which individual downlink data signals are not mapped (hereinafter, referred to as a "guard time") between a time in which an individual downlink data signal is allocated and a time in which another individual downlink data signal is allocated as needed.

The base station 20b allocates the individual downlink data signals to the TDD slots of early timings in order from the signals addressed to the terminal stations 10 having large propagation distances. When the response signals (ACK signals) transmitted from the terminal stations 10 are received by the base station 20b at overlapping times, a collision of the response signals may occur. To suppress such collision, when it is estimated that a collision of the response signals will occur, the base station 20b sets the guard time between the time in which an individual downlink data signal is mapped and the time in which the next individual downlink data signal is mapped. Hereinafter, the base station 20b will be described in more detail.

FIG. 5 is a diagram illustrating a detailed configuration example of the base station 20 (base station 20b) of the second embodiment.

The base station 20b differs from the base station 20a according to the first embodiment in that an allocation unit 225b is provided instead of the allocation unit 225a and a guard time decision unit 226 is provided, and other configurations are similar to those of the base station 20a of the first embodiment.

When the collision determination unit 224 determines that a collision will occur, the guard time decision unit 226 decides the guard time for avoiding the collision.

When the guard time is decided by the guard time decision unit 226, the allocation unit 225b changes the mapping of the individual downlink data based on a length and an insertion position of the decided guard time.

Figure 6:
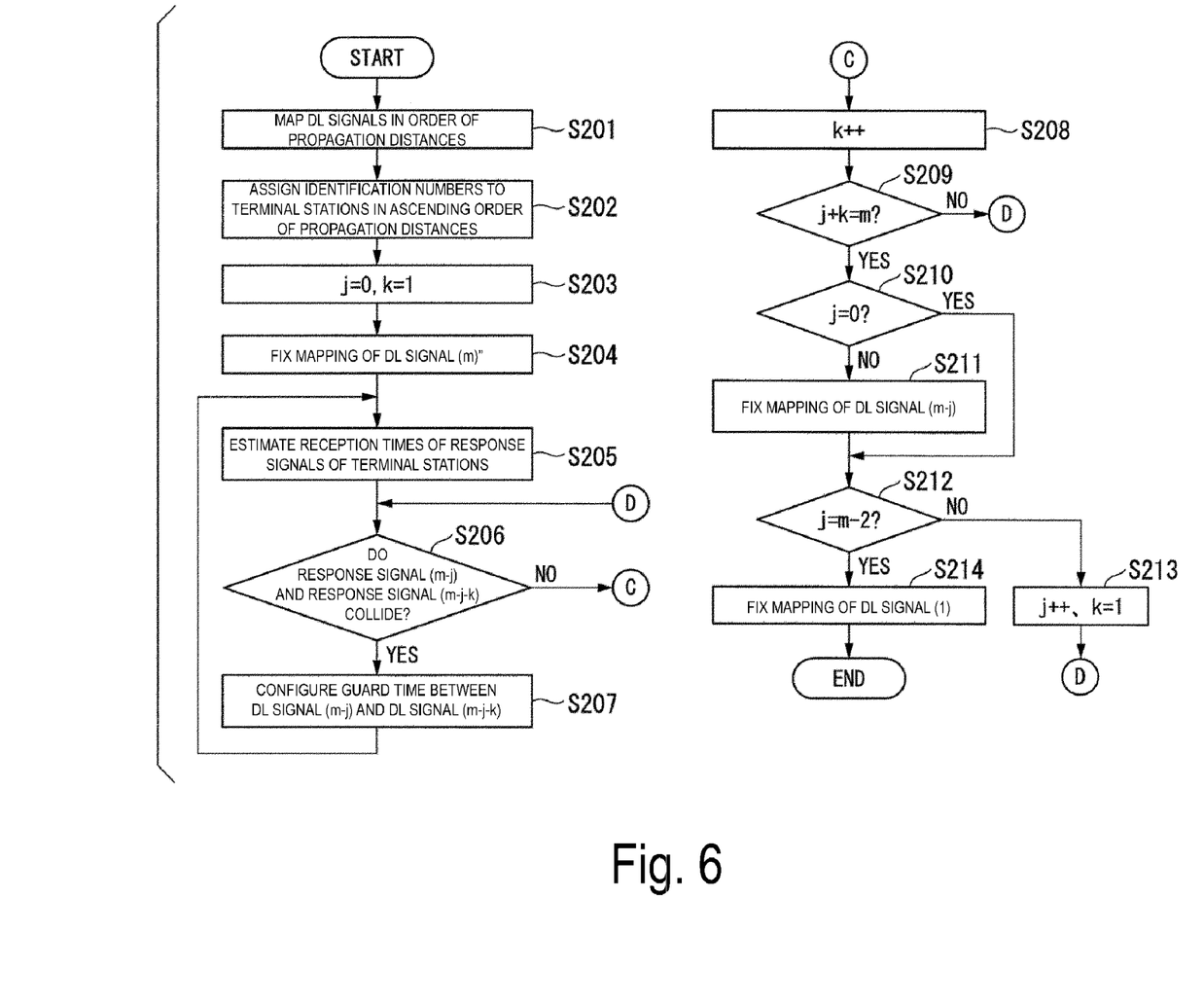
FIG. 6 is a flowchart illustrating a specific example of a flow of an operation of the base station 20b (second embodiment).

FIG. 6 is a flowchart illustrating a specific example of a flow of an operation of the base station 20b (second embodiment). The method described in FIG. 6 is similar to the method described in FIG. 3.

First, the allocation unit 225b maps the individual downlink data signals to early times in order from the signals addressed to the terminal stations 10 having large propagation distances (step S201). The propagation distances are acquired by the propagation distance acquisition unit 222. When the base station 20b and the terminal station 10 are securely installed, the propagation distances may be stored as known distances in a storage device of the signal processing unit 22b in advance, or values acquired once by the propagation distance acquisition unit 222 may be used for a predetermined period of time.

The allocation unit 225b assigns identification numbers to the terminal stations 10 in ascending order of the propagation distances (step S202). The identification numbers are, for example, integers arranged in order from 1. In this case, the identification number of the terminal station 10 having the shortest propagation distance is "1", and the identification number of the terminal station 10 having the longest propagation distance is "m". Integer variables j and k are initialized (step S203). For example, "0" is substituted for the value of j and "1" is substituted for k.

The allocation unit 225b fixes the mapping of the DL signal (m), which is the individual downlink data signal transmitted to the m-th terminal station 10, on the time axis (step S204). Through such processing, similar to the reason described in the first embodiment, the effect obtained by transmitting the individual downlink data signals in order from the signals addressed to the terminal stations 10 having large propagation distances can be achieved.

Subsequently, the reception time acquisition unit 223 estimates a time at which the response signal transmitted by each terminal station 10 will be received (response reception time) for each individual downlink data signal (step S205). The targets for which the response reception times are estimated are all the response signals.

Here, the collision determination unit 224 determines whether the response signal (m−j) which is the response signal transmitted by the (m−j)-th terminal station 10 and the response signal (m−j−k) which is the response signal transmitted by the (m−j−k)-th terminal station 10 collide with each other by comparing the response reception time of the response signal (m−j) with the response reception time of the response signal (m−j−k) (step S206).

When the response reception time of the response signal (m−j) and the response reception time of the response signal (m−j−k) overlap with each other, the collision determination unit 224 determines that a collision of the response signals will occur (step S206—YES). In this case, the guard time decision unit 226 decides a length of the guard time between the DL signal (m−j) and the DL signal (m−j−k) such that a collision of the response signal (m−j) and the response signal (m−j−k) does not occur. When a reception start time of the response signal (m−j) before the guard time is set is t1 and a reception completion time of the response signal (m−j−k) is t2, the guard time decision unit 226 may decide, as the guard time, a length of |t2−t1|+α. α is a predetermined positive constant. The allocation unit 225b sets the guard time between the DL signal (m−j) and the DL signal (m−j−k) based on the length of the guard time decided by the guard time decision unit 226 (step S207).

After the processing of step S207, the processing of the signal processing unit 22b returns to the processing of step S205. The processing of step S205 and subsequent steps are executed again after the processing of step S207 as stated above, and thus, the collision of the response signals newly caused by the setting of the guard time may be prevented.

When the response reception time of the response signal (m−j) and the response reception time of the response signal (m−j−k) do not overlap with each other in the processing of step S206, the collision determination unit 224 determines that a collision of the response signals will not occur (step S206—NO). In this case, the allocation unit 225b performs the following processing.

The allocation unit 225b increments the value of k (step S208). When the value of j+k is not equal to the value of m (step S209—NO), the processing of the signal processing unit 22b returns to the processing of step S206. In contrast, when the value of j+k is equal to the value of m (step S209—YES), the value of j is not 0 (step S210—YES), the allocation unit 225b fixes the mapping of the DL signal (m−j) (step S211).

When the value of j is not equal to the value of m−2 (step S212—NO), the allocation unit 225b increments the value of j, and sets the value of k to 1 (step S213). The processing of the signal processing unit 22b returns to the processing of step S206. When the value of j is equal to the value of m−2 (step S212), the allocation unit 225b fixes the mapping of the DL signal (1) (step S214). The processing of the signal processing unit 22b is completed.

Figure 7:
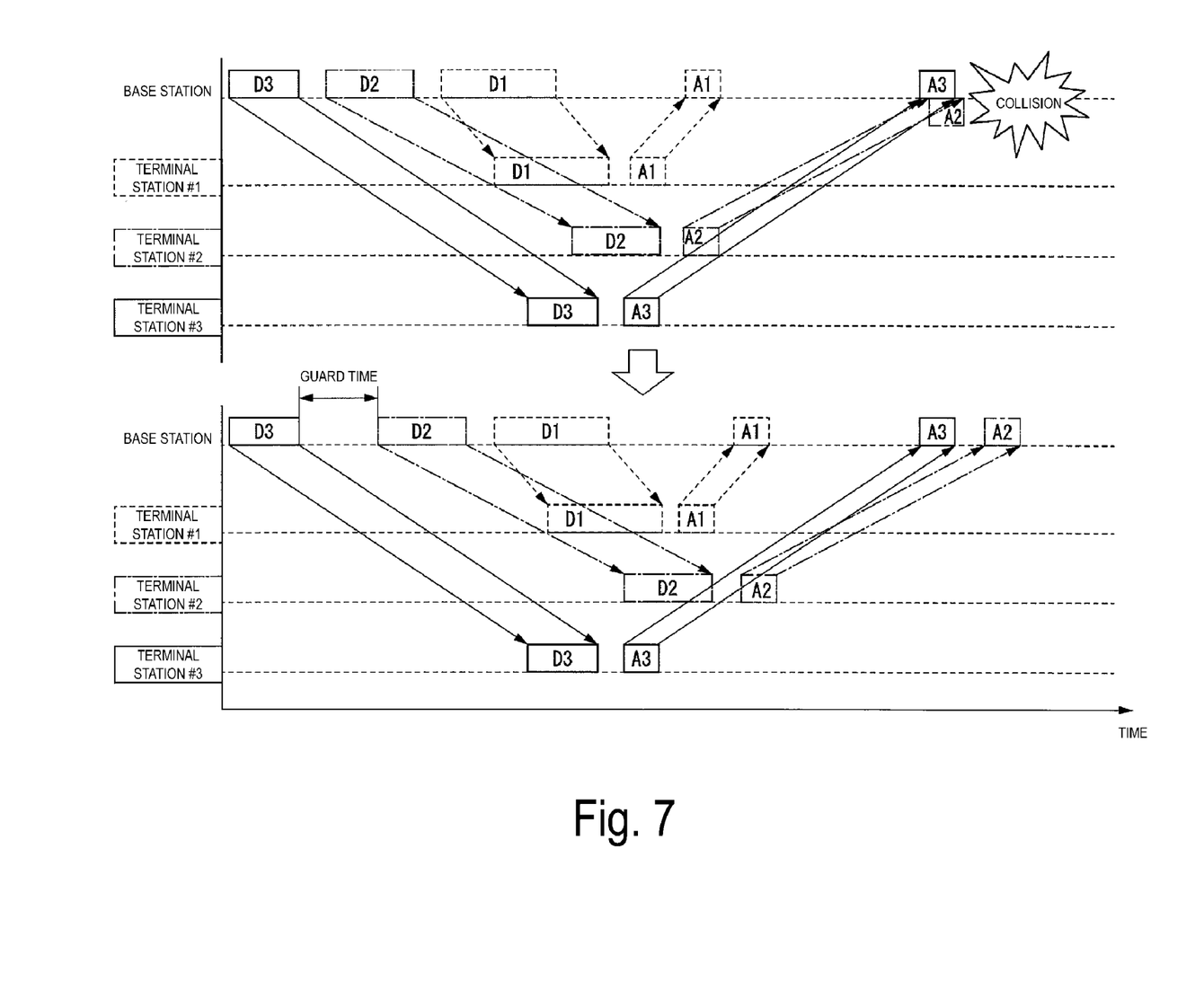
FIG. 7 is a diagram illustrating a specific example of processing when individual downlink data signals are transmitted from the base station 20b to three terminal stations 10 (m=3).

FIG. 7 is a diagram illustrating a specific example of processing when the individual downlink data signals are transmitted from the base station 20b for three terminal stations 10 (m=3). In the example in FIG. 7, the propagation distances between the base station 20b and the terminal stations 10 are terminal station #1<terminal station #2<terminal station #3. D1, D2, and D3 indicate the individual downlink data signal addressed to the terminal station #1, the individual downlink data signal addressed to the terminal station #2, and the individual downlink data signal addressed to the terminal station #3, respectively. A1, A2, and A3 indicate the response signal transmitted from the terminal station #1, the response signal transmitted from the terminal station #2, and the response signal transmitted from the terminal station #3, respectively. A top row in FIG. 7 represents initial positions of the individual downlink data signals provisionally mapped in step S201. A bottom row in FIG. 7 represents the positions for which the individual downlink data signals are definitely mapped by the allocation unit 225b.

First, the response reception time for each of the terminal stations 10 is acquired based on the provisional allocation as represented in the top row in FIG. 7. In this example, the response signal (A2) transmitted by the terminal station #2 collides with the response signal (A3) transmitted by the terminal station #3. Thus, the allocation unit 225b sets the guard time between the individual downlink data signal addressed to the terminal station #3 and the individual downlink data signal addressed to the terminal station #2 such that a collision of the response signals will not occur, by the processing of step S207 illustrated in FIG. 6. In the mapping, after the guard time has been set, a collision does not occur. As a result, the mapping represented in the bottom row in FIG. 7 is fixed.

In the second embodiment having the aforementioned configuration, similar to the first embodiment, it is determined whether a collision will occur when receiving the response signal transmitted from the terminal station 10. When it is determined that a collision will occur, the reception timing of the response signal is changed such that the collision does not occur through setting of the guard time between the individual downlink data signals. Thus, the base station 20b may transmit individual downlink data signals to the terminal stations 10 by using the idle time caused by the long delay. Accordingly, transmission efficiency may be improved by effectively using the idle time caused by a long delay.

Modification Example

In the aforementioned first and second embodiments, one antenna unit 21 is provided for one signal processing unit 22 (22a or 22b). However, a plurality of antenna units 21 may be provided for one signal processing unit 22 (22a or 22b). In this case, for example, the propagation delay time corresponding to each antenna unit 21 may be acquired based on the aforementioned first specific example. In this case, a difference between the positions of the antenna units 21 is considered to be sufficiently shorter than the propagation distance, and thus, the propagation delay time may be acquired under the assumption that the antenna units 21 are installed at an identical location. When the propagation delay time is acquired based on the second specific example, a propagation delay time that also reflects the difference between the positions of the individual antenna units 21 may be acquired.

The embodiments of the present disclosure have been described above in detail with reference to the drawings. However, specific configurations are not limited to those embodiments, and include any design or the like within the scope not departing from the gist of the present disclosure.

INDUSTRIAL APPLICABILITY

The present disclosure is applicable to a radio communication system that transmits signals to a plurality of terminal stations in radio communication.

REFERENCE SIGNS LIST

10 Terminal station
20, 20a, 20b Base station
30 Upper level apparatus
21 Antenna unit
211 Communication unit
22, 22a, 22b Signal processing unit
221 Communication unit
222 Propagation distance acquisition unit
223 Reception time acquisition unit
224 Collision determination unit
225a, 225b Allocation unit
226 Guard time decision unit

The invention claimed is:

1. An allocation method for, when a base station transmits individual downlink data signals to a plurality of terminal stations, allocating the individual downlink data signals to positions on a time axis, the allocation method comprising:

provisionally allocating individual downlink data signals of the individual downlink data signals for terminal stations of the plurality of terminal stations having long propagation delay times to positions of relatively early timings and provisionally allocating individual downlink data signals of the individual downlink data signals for terminal stations of the plurality of terminal stations having short propagation delay times to positions of relatively late timings, wherein the positions of relatively early timings are earlier than the positions of relatively late timings on the time axis;

estimating whether a collision will occur when receiving response signals transmitted from the terminal stations;

changing the positions such that, when it is estimated that the collision will occur when receiving response signals transmitted from the terminal stations, it is estimated that the collision will not occur, in the provisionally allocating; and fixing, as the positions of the individual downlink data signals on the time axis, the positions changed in the changing of the positions;

wherein, the positions are changed by setting an idle time in which an individual downlink data signal of the individual downlink data signals is not allocated between the position of a certain individual downlink data signal of the individual downlink data signals corresponding to at least one of the response signals for which it is estimated that the collision will occur and the position of another individual downlink data signal of the individual downlink data signals corresponding with the certain individual downlink data signal.

2. The allocation method according to claim 1, wherein in the changing of the positions, when it is estimated that a collision will occur when receiving the response signals transmitted from the terminal stations, the positions are changed by replacing the position of an individual downlink data signal of the individual downlink data signals corresponding to at least one of the response signals for which it is estimated that the collision will occur with the position of another individual downlink data signal of the individual downlink data signals.

3. The allocation method according to claim 2, wherein the positions on the time axis are slots for time division duplex (TDD).

4. A signal processing apparatus constituting a base station configured to transmit individual downlink data signals to a plurality of terminal stations, the signal processing apparatus comprising:

a processor; and a storage medium having computer program instructions stored thereon, when executed by the processor, perform to:

allocate the individual downlink data signals to positions on a time axis, and provisionally allocate individual downlink data signals of the individual downlink data signals for terminal stations of the plurality of terminal stations having long propagation delay times to positions of relatively early timings, provisionally allocate individual downlink data signals of the individual downlink data signals for terminal stations of the plurality of terminal stations having short propagation delay times to positions of relatively late timings, change the positions such that, when it is estimated that a collision will occur when receiving response signals transmitted from the terminal stations, it is estimated that the collision will not occur, in the provisionally allocating, and fix, as the positions of the individual downlink data signals on the time axis, the changed positions, wherein, the positions are changed by setting an idle time in which an individual downlink data signal of the individual downlink data signals is not allocated between the position of a certain individual downlink data signal of the individual downlink data signals corresponding to at least one of the response signals for which it is estimated that the collision will occur and the position of another individual downlink data signal of the individual downlink data signals corresponding with the certain individual downlink data signal.

\* \* \* \* \*